United States Patent
Ray et al.

(10) Patent No.: US 9,043,040 B2
(45) Date of Patent: May 26, 2015

(54) POWER SYSTEM STABILIZATION

(75) Inventors: Swakshar Ray, Guilderland, NY (US); Mark Gerard Adamiak, Paoli, PA (US); Amol Rajaram Kolwalkar, Bangalore (IN)

(73) Assignee: General Electric Company, Niskayuna, NY (US)

( * ) Notice: Subject to any disclaimer, the term of this patent is extended or adjusted under 35 U.S.C. 154(b) by 614 days.

(21) Appl. No.: 13/362,235

(22) Filed: Jan. 31, 2012

(65) Prior Publication Data
US 2013/0197705 A1 Aug. 1, 2013

(51) Int. Cl.
*G05D 11/00* (2006.01)
*H02J 3/24* (2006.01)

(52) U.S. Cl.
CPC ........................................ *H02J 3/24* (2013.01)

(58) Field of Classification Search
None
See application file for complete search history.

(56) References Cited

U.S. PATENT DOCUMENTS

| | | | | |
|---|---|---|---|---|
| 6,476,521 B1 * | 11/2002 | Lof et al. | | 307/105 |
| 6,559,561 B1 * | 5/2003 | Angquist | | 307/105 |
| 6,985,800 B2 | 1/2006 | Rehtanz et al. | | |
| 2009/0088989 A1 | 4/2009 | Guzman-Casillas | | |
| 2009/0089608 A1 | 4/2009 | Guzman-Casillas | | |
| 2011/0077885 A1 | 3/2011 | Zweigle et al. | | |
| 2011/0093124 A1 * | 4/2011 | Berggren et al. | | 700/286 |
| 2011/0126038 A1 * | 5/2011 | Korba et al. | | 713/401 |
| 2013/0175871 A1 * | 7/2013 | Knuppel et al. | | 307/102 |

FOREIGN PATENT DOCUMENTS

| | | |
|---|---|---|
| EP | 2312719 A1 | 4/2011 |
| WO | 2009141297 A1 | 11/2009 |

OTHER PUBLICATIONS

M.T.S. van As et al., A GPS Based Time-Stamping and Scheduling System for Wide Area Power System Measurements,: IEEE Africon, 2002, pp. 853-857.

H. Kang et al., "PMU simulation and application for power system stability monitoring," IEEE, 2009, pp. 1-7.

H. Wu et al., "Evaluation of Time Delay Effects to Wide-Area Power System Stabilizer Design," IEEE Transactions on Power Systems, vol. 19, No. 4, Nov. 2004, pp. 1935-1941.

* cited by examiner

*Primary Examiner* — Kenneth Lo
*Assistant Examiner* — Md N Mia
(74) *Attorney, Agent, or Firm* — Nitin N. Joshi

(57) ABSTRACT

A method of damping power system oscillations include obtaining a time synchronized damping control signal from a remote location and determining a communication time delay in receiving the time synchronized damping control signal from the remote location. The time synchronized damping control signal is then modified based on a phase compensation factor and an amplitude compensation factor determined from the time delay. Finally, a damping signal is generated based on the modified time synchronized damping control signal.

17 Claims, 5 Drawing Sheets

POWER SYSTEM STABILIZATION

BACKGROUND

Embodiments of the present invention relate generally to a power flow in a power system. More specifically, the embodiments relate to damping of power system oscillations.

The power system is a complex network comprising of numerous generators, transmission lines, a variety of loads and transformers. With increasing power demand in the power system, some transmission lines are more stressed than was planned when they were built. Since stressed conditions can lead a system to unstable conditions, power system stability has become an important issue. In simple terms, power system stability is defined as the ability of the power system to return to a normal state after a disturbance. The disturbance may be a fault, a loss of a generator or even a sudden increase in power loading which results in power oscillations in power system.

Most of the existing approaches for damping measures are initiated merely from the point of view of single subsystems, which are independent in their operation. The damping measures are not coordinated with other regions. For example, Power system stabilizers (PSSs) are the most common damping control devices in power systems. The PSSs of today usually rely on local information (such as generator rotor speed or electric power) and are effective in damping local modes. Carefully tuned PSSs may also be able to damp some inter-area oscillations; those which can be observed in the monitored local input signals. However, the observability of inter-area modes in local signals is low, compared to global signals, and therefore limits to a certain extent the effectiveness of PSSs in damping multiple inter-area oscillations.

A recent approach to damp the inter-area oscillations is to utilize a centralized control employing wide area measurement system (WAMS). The major limitation of centralized control is that the communication delay latencies would cause the control signal to have a phase shift that could potentially affect the system stability. Robust controllers that are not impacted by variations such as time delays, which are considered as noise, is one of the solution to address this problem. Another solution is to tune controller parameters using intelligent techniques so that a controller is capable of handling time delays, but this would result in degradation of the controller performance as the settings would have to be changed to cater to the time delays.

For these and other reasons, there is a need for the present invention.

BRIEF DESCRIPTION

In accordance with an embodiment of the present invention a method of damping power system oscillations is presented. The method includes obtaining a time synchronized damping control signal from a remote location and determining a communication time delay in receiving the time synchronized damping control signal from the remote location. The method further includes modifying the time synchronized damping control signal based on a phase compensation factor and an amplitude compensation factor determined from the time delay and generating a damping signal based on the modified time synchronized damping control signal.

In accordance with another embodiment of the present invention, a system for damping power system oscillations is presented. The system includes a remote controller to generate a time synchronized damping control signal based on measurement signals. The system further includes a local controller to generate damping control signal by modifying the time synchronized damping control signal based on a phase compensation factor and an amplitude compensation factor determined from a communication time delay in receiving the time synchronized damping control signal from the remote location. The system also includes a damping device to generate a damping signal based on the damping control signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As used herein, the term "controller" refers to software, hardware, or firmware, or any combination of these, or any system, process, or functionality that performs or facilitates the processes described herein.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
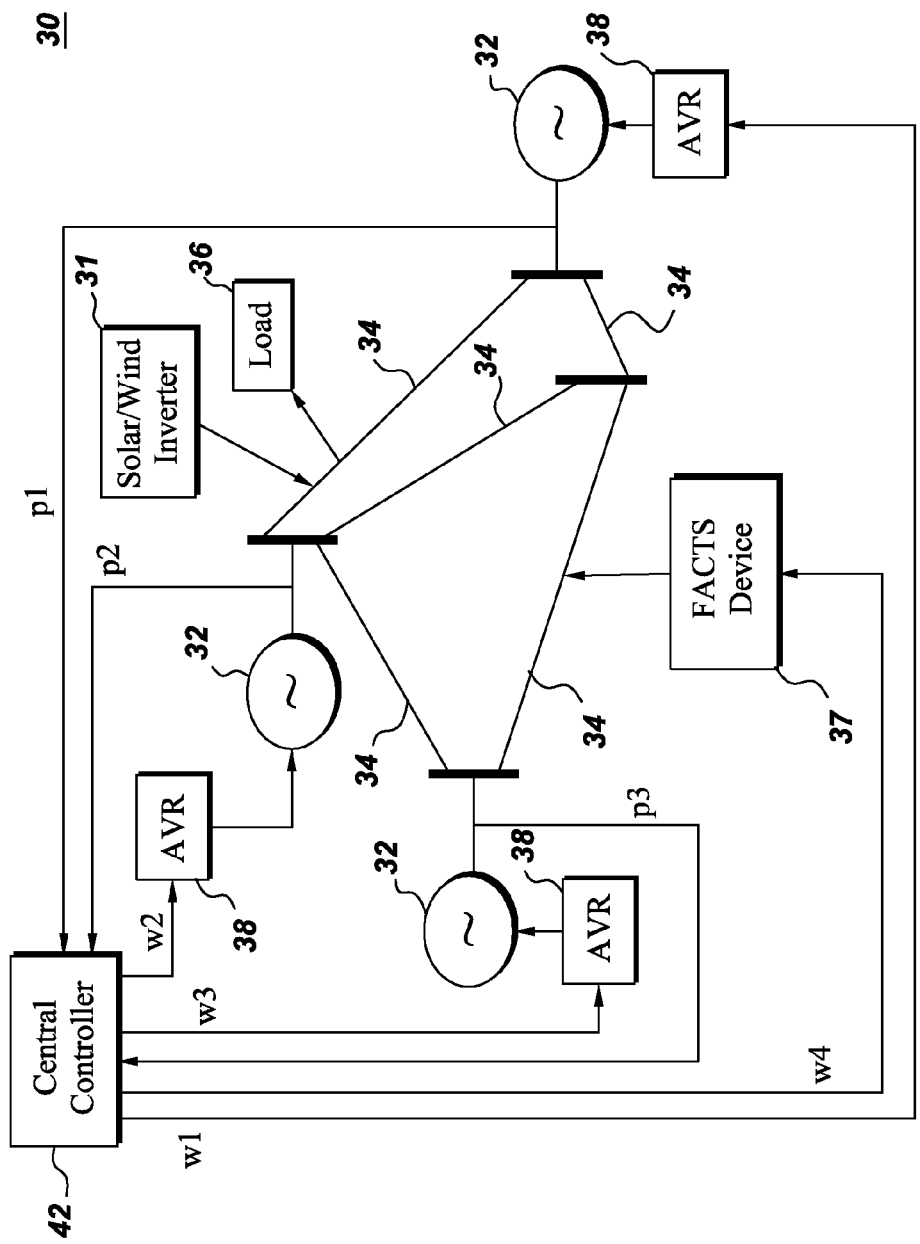
FIG. 1 is a schematic diagram of a power system illustrating a system for damping power system oscillations in accordance with an embodiment of the present invention.

FIG. 1 shows a power system network 30 illustrating a system for damping power system oscillations in accordance with an embodiment of the present invention. Power system network 30 includes generators 32, transmission lines 34, and load 36. Power system network 30 further includes damping devices such as automatic voltage regulator (AVR) 38 or a Flexible Alternating Current Transmission System (FACTS) device 37 or even a solar plant or wind plant inverter 31. AVR 38 can damp power system oscillations by controlling the excitation of generator 32 and thus, by controlling power output of the generator based on an input from a central controller 42. Similarly, FACTS device 37 and solar or wind plant inverter 31 can damp power system oscillations by either injecting or absorbing appropriate active and reactive power from the power system network 30 based on an input from central controller 42. Further, damping devices may be used for other purposes apart from damping the oscillations. For example, the AVR may be used to control a generator output voltage, but when a power system stabilizer (PSS) is used it will also serve the function of the damping device.

Central controller 42 receives measurement signals such as generator power output signals (p1, p2, and p3) or generator speed signals from various remote locations. In some embodiments, measurement signals may include generator output voltage or generator output current signals. Central controller 42 extracts various oscillation modes such as inter-area or local oscillation modes from the measurement signals and provides appropriate control signals (w1, w2, w3 and w4) to AVR 38 to cancel out the oscillation modes. In one embodiment, AVRs 38 each have an individual controller (not shown) designed for a secondary purpose such as for reactive power compensation or voltage compensation and output from central controller 42 is added to reference signals of the those individual controllers as described in following paragraphs. Thus, the individual controller in addition to its secondary purpose also acts on command from central controller 42 to damp the power system oscillations.

Figure 2:
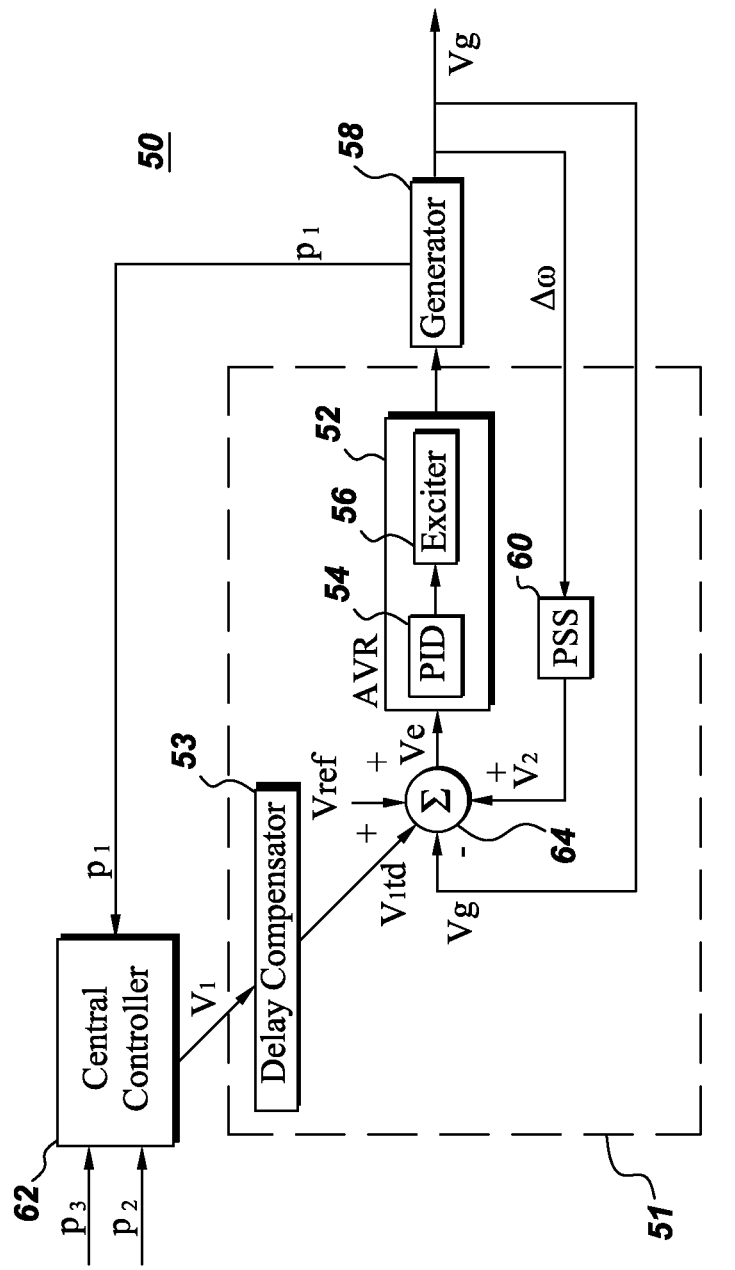
FIG. 2 is a block diagram of a power control system 50 for damping power system oscillations.

FIG. 2 shows a power control system 50 for damping power system oscillations. Power control System 50 includes a central controller 62 and a local controller 51 with a delay compensator 53, an AVR 52, a generator 58, a power system stabilizer (PSS) 60. Power control system 50 is used for controlling a generator output voltage Vg and also to increase a damping ratio (a mathematical means of expressing the level of damping in a system relative to critical damping) of the generator so as to damp power oscillations.

Generator output voltage Vg is fed back to a summing point 64 and is subtracted from a summation of a reference voltage Vref which is a desired generator output voltage Vg, a first control signal V1$td$ and a second control signal V2. A difference signal Ve is then provided to AVR 52. AVR 52 includes a proportional, integral and derivative (PID) controller 54 and an exciter 56. PID controller 54 and exciter 56 together help in generating a voltage at output terminals of generator 58 which is equal to the combination of reference voltage Vref, first control signal V1$td$ and second control signal V2. PSS 60 provides second control signal V2 for compensating local mode oscillations based on a generator speed deviation signal $\Delta\omega$. PSS 60 can also generate second control signal V2 based on other input signals such as a change in generator power output $\Delta P$ or speed $\omega 1$ or power signal P. PSS 60 utilizes a gain and a phase compensator (not shown) to generate second control signal V2. It should be noted that in some embodiments, there may not be any PSS and local controller 51 will compensate only for first control signal V1$td$ and reference voltage Vref.

Central controller 62 may include a memory for storing data, processing circuitry for processing data and communication elements such as transmitters and receivers for transmitting and receiving data. Central controller 62 analyzes the power measurement signals (p1, p2, and p3) and identifies oscillation modes such as local mode and inter-area mode from those signals. Identification of oscillation modes helps in determining how close the network is to instability. Central controller 62 further generates a remote control signal V1 for damping these oscillations. In other words central controller 62 is similar to PSS 60, but damps a different set of oscillations.

In one embodiment, remote control signal V1 is time synchronized (i.e., the signal V1 which is a time varying signal also has a time stamp associated with it to indicate the time at which remote control signal V1 was sent to local controller 51). In one embodiment, a Global Positioning System (GPS) may be utilized to time stamp remote control signal V1. In another embodiment, a server time reference may be utilized to time stamp remote control signal V1. At local controller 51, delay compensator 53 determines the time at which remote control signal V1 is received and determines a communication time delay Td between a time at which remote control signal V1 was sent by central controller 62 and a time at which remote control signal V1 was received by local controller 51. Delay compensator 53 further adjusts the phase and amplitude of remote control signal V1 according to the communication time delay and generates first control signal V1$td$. Thus, the communication time delay Td associated with transmission of the control signal from the central controller to the local controller does not affect the damping control. As described earlier, in an embodiment, central controller 62 may also provide a control signal to other damping devices such as a FACTS device, a solar plant inverter or a wind plant inverter.

Figure 3:
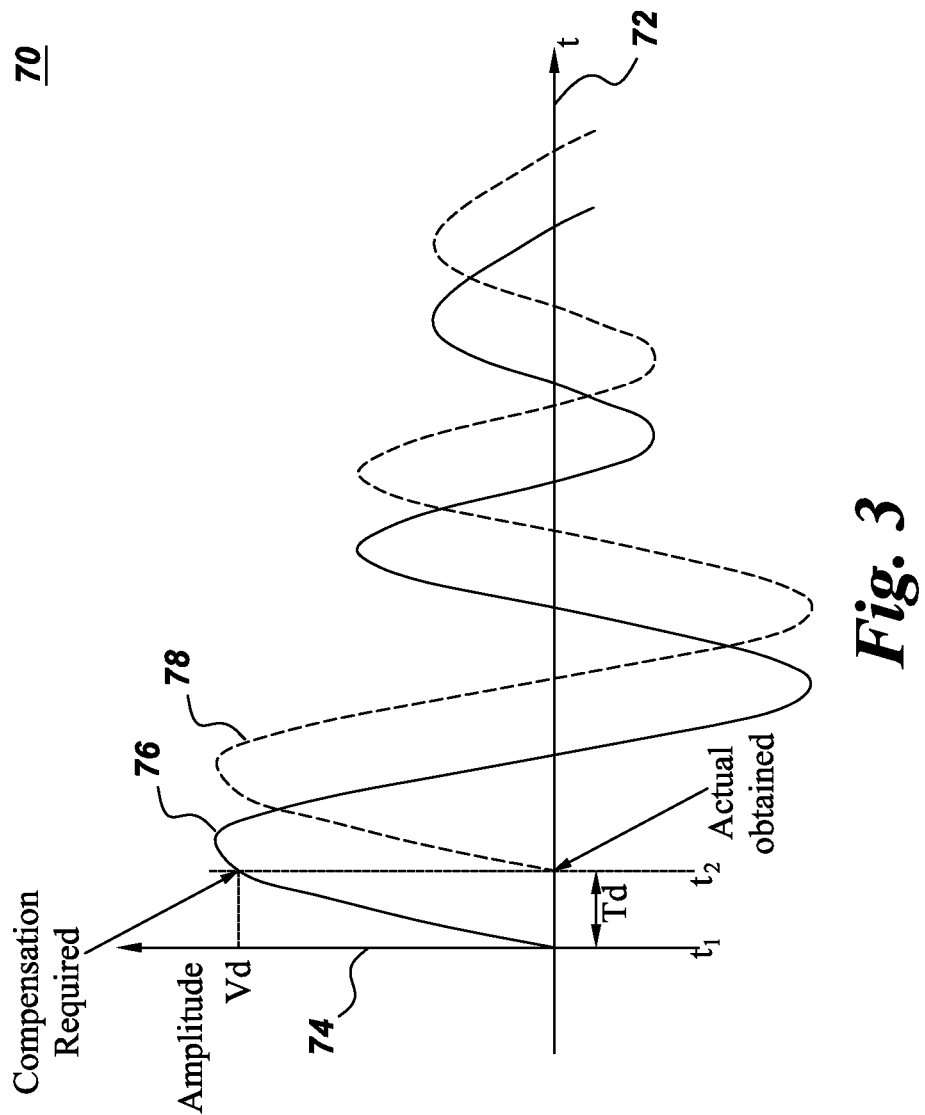
FIG. 3 is a graphical plot illustrating details of impact of a communication delay on oscillation compensation.

FIG. 3 shows a graphical plot 70 representing impact of a communication delay on oscillation compensation. In plot 70, a horizontal axis 72 represents time in seconds and a vertical axis 74 represents amplitude in volts. Plot 70 has two waveforms 76 and 78. Waveform 76 is a remote control signal sent by a central controller and waveform 78 is the same control signal received by a local controller but with a communication delay of time Td. Basically, at a time t1, the central controller sends waveform 76 to the local controller but the local controller receives waveform 76 only at time t2. The communication time delay Td=t1−t2 makes waveform 76 appear like a phase/time delayed waveform 78 at local controller at time t2. Thus, without any communication time delay compensation, the local controller will try to compensate for waveform 78 which is of zero amplitude at time t2 rather than waveform 76 which should be of amplitude Vd at time t2. This phase shift in signal may result in instability in the system.

Figure 4:
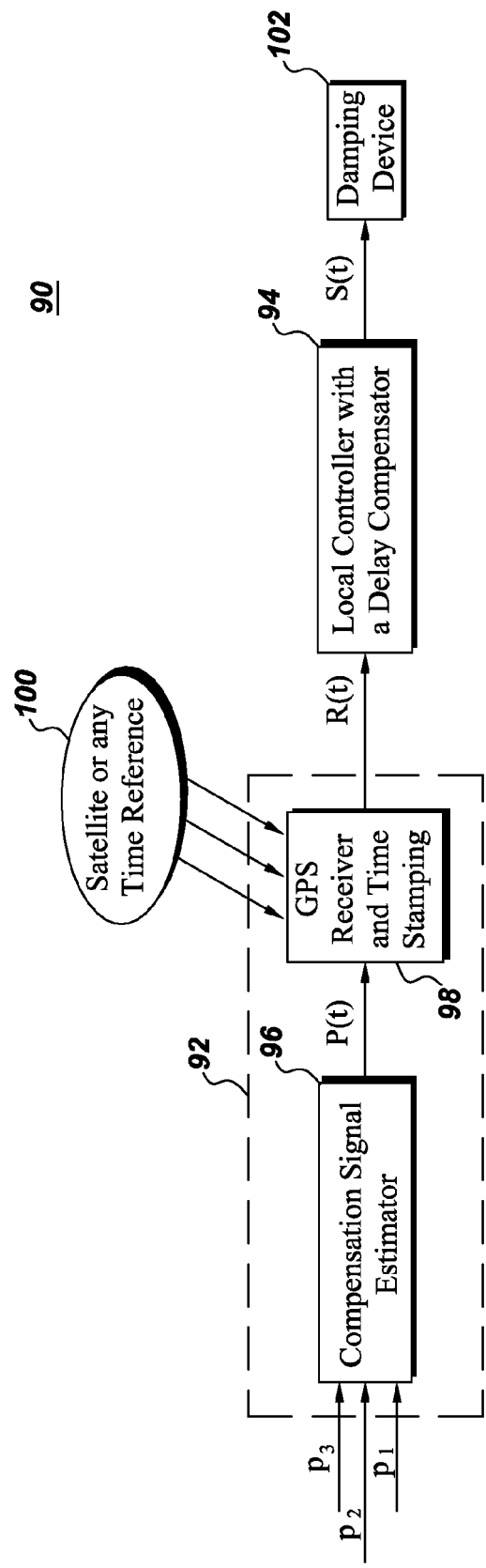
FIG. 4 is a block diagram illustrating details of a control signal synchronization system in accordance with an embodiment of the present invention.

FIG. 4 shows a block diagram illustrating details of a system 90 for damping power system oscillations in accordance with an embodiment of the present invention. System 90 includes a central controller 92 and a local controller 94. Central controller 92 includes a compensation signal estimator 96 and a geographical positioning system (GPS) and a time stamping module 98. Compensation signal estimator 96 receives measurement signals such as power (p1, p2, p3) from various generators located at remote locations. Compensation signal estimator 96 then determines various oscillations modes in system based on measurement signals and generates appropriate remote damping control signal P(t) for a damping device 102. It should be noted that even though a single remote damping control signal P(t) is shown compensation signal estimator will generate a plurality of control signals for a plurality of damping devices. The damping devices may be, for example, AVRs, FACTS devices or converters in solar and wind farms.

Remote damping control signal P(t) is then sent to GPS receiver and time stamping block 98 for generating a time synchronized or time stamped damping control signal R(t). GPS receiver and time stamping block 98 receives a time reference from a satellite 100. In one embodiment, GPS receiver and time stamping block 98 may utilize the time reference from a server (not shown) to time stamp remote damping control signal P(t) and generate a time synchronized damping control signal R(t).

Local controller 94 receives time synchronized damping control signal R(t) and determines a communication time delay Td in receiving the signal R(t). Local controller 94 further generates a local damping control signal S(t) for damping device 102 with appropriate phase and amplitude compensation based on communication time delay Td. For example, if time synchronized damping control signal R(t) can be given as below:

$$R(t) = A^{*} e^{-\xi_1 t} \sin(\omega_1 t) \quad (1)$$

where A one of the amplitude factors, $\xi_1$ is a damping ratio and $\omega_1$ is a frequency of the oscillation mode that need to be compensated, then local damping control signal S(t) may be given as $$S(t)=A*e^{-\xi_1(t-T_d)}\sin(\omega_1(t-T_d)) \quad (2)$$

In one embodiment, central controller 92 may transmit time stamped frequency domain signal rather than a time domain signal as in equation (1) to local controller 94 and then local controller 94 will modify it appropriately to generate local damping control signal S(t). In another embodiment, central controller 92 may just transmit time stamped damping control signal parameters such as A and $\xi_1$ and then local controller 94 recreates the local damping control signal S(t) based on these parameters and associated time delay.

Figure 5:
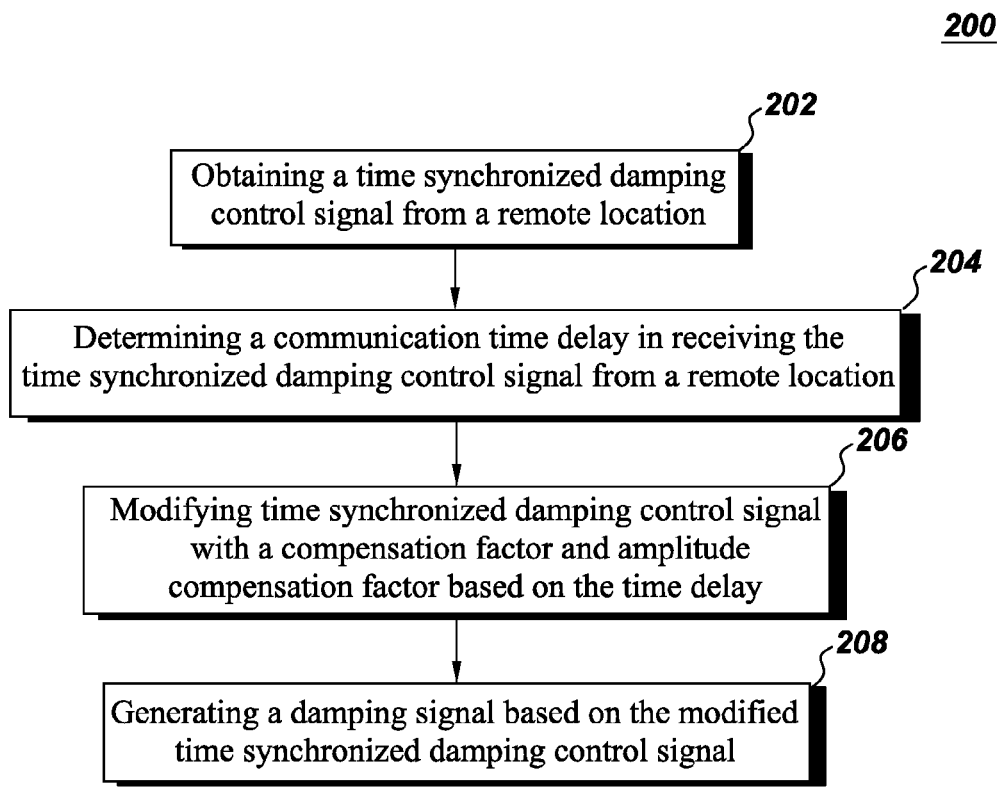
FIG. 5 is a flow chart illustrating a method of damping power system oscillations in accordance with an embodiment of the present invention.

FIG. 5 shows a flow chart 200 illustrating a method of damping power system oscillations in accordance with an embodiment of the present invention. The method includes obtaining a time synchronized or time stamped damping control signal from a remote location at step 202. In one embodiment, the time synchronized damping control signal is transmitted by a remote controller to a local controller. The remote controller generates the time synchronized damping control signal by time stamping a remote damping control signal based on a time reference. The time reference may be obtained from a GPS or a server.

At step 204, the local controller determines a communication time delay in receiving the time synchronized damping control signal from the remote location. The local controller determines the communication time delay by subtracting a time on the time stamp of the time synchronized damping control signal from a time at which the time synchronized damping control signal was received at the local controller. At step 206, the local controller further modifies the time synchronized damping control signal with a phase compensation factor and amplitude compensation factor determined based on the time delay. The modified time synchronized damping control signal or local damping control signal is then further utilized to generate a damping signal by a damping device in step 208, wherein the damping device may include an AVR, a FACTS device or a solar plant or a wind plant inverter.

One of the advantages of the claimed invention is that since the control signals are compensated at the location of the actuator, system stability is not compromised due to the communication delays. Commercially this may be an enabler to phasor measurement units (PMUs) that could then be used as Phasor Control Units (PCUs).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of damping power system oscillations comprising:
    obtaining a time synchronized damping control signal from a remote location;
    determining a communication time delay in receiving the time synchronized damping control signal from the remote location;
    modifying the time synchronized damping control signal based on both a phase compensation factor and an amplitude compensation factor, wherein both the phase compensation factor and the amplitude compensation factor are determined from the communication time delay; and
    generating a damping signal based on the modified time synchronized damping control signal.

2. The method of claim 1, wherein obtaining the time synchronized damping control signal includes time stamping a remote damping control signal.

3. The method of claim 2, wherein time stamping the remote damping control signal comprises utilizing a geographic position system (GPS) time reference or a server time reference.

4. The method of claim 2, wherein the remote damping control signal is determined based on oscillation modes in measurement signals.

5. The method of claim 4, wherein oscillation modes include at least one of an inter-area oscillation mode and local oscillation mode.

6. The method of claim 4, wherein measurement signals include generator output voltage signals, generator output current signals, generator output power signals or generator speed signals.

7. The method of claim 1, wherein the time synchronized damping control signal comprises a time domain damping control signal or a frequency domain damping control signal or damping control signal parameters.

8. The method of claim 1, wherein generating the damping signal based on the modified time synchronized damping control signal comprises utilizing a damping device to generate the damping signal.

9. The method of claim 1, wherein the damping device comprises at least one of an automatic voltage regulator, a flexible alternating current transmission device, a solar plant inverter or a wind plant inverter.

10. A system for damping power system oscillations comprising:
    a remote controller to generate a time synchronized damping control signal based on measurement signals;
    a local controller to generate damping control signal by modifying the time synchronized damping control signal based on both a phase compensation factor and an amplitude compensation factor, wherein both the phase compensation factor and amplitude compensation factor are determined from a communication time delay in receiving the time synchronized damping control signal from the remote location; and
    a damping device to generate a damping signal based on thedamping control signal.

11. The system of claim 10, wherein the remote controller generates the time synchronized damping control signal by time stamping a remote control signal with a time reference.

12. The system of claim 11, further comprising a Global Positioning System (GPS) time or a server to generate the time reference.

13. The system of claim 11, wherein the remote controller comprises a compensation signal estimator to generate the remote control signal based on oscillation modes in measurement signals.

14. The system of claim 11, wherein oscillation modes include at least one of an inter-area oscillation mode and local oscillation mode.

15. The system of claim 10, wherein the time synchronized damping control signal comprises a time domain damping control signal or a frequency domain damping signal or damping control signal parameters.

16. The system of claim 10, wherein the damping device comprises at least one of an automatic voltage regulator, a flexible alternating current transmission device, a solar plant inverter or a wind plant inverter.

17. The system of claim 10, wherein measurement signals include generator output voltage signals, generator output current signals, generator output power signals or generator speed signals.

* * * * *